(12) United States Patent
Chassoulier et al.

(10) Patent No.: US 10,724,615 B2
(45) Date of Patent: Jul. 28, 2020

(54) CONTROL DEVICE FOR LINEAR ACTUATOR, AND ASSOCIATED ACTUATOR, METHOD AND USE

(71) Applicant: THALES, Courbevoie (FR)

(72) Inventors: Damien Chassoulier, Mouans-Sartoux (FR); Didier Stanek, Cannes la Bocca (FR); Alain-Vincent Blanc, Grasse (FR)

(73) Assignee: THALES, Courbevoie (FR)

( * ) Notice: Subject to any disclaimer, the term of this patent is extended or adjusted under 35 U.S.C. 154(b) by 557 days.

(21) Appl. No.: 15/338,339

(22) Filed: Oct. 29, 2016

(65) Prior Publication Data

US 2017/0130810 A1    May 11, 2017

(30) Foreign Application Priority Data

Nov. 6, 2015 (FR) ...................... 15 02340

(51) Int. Cl.
| | |
|---|---|
| *H02K 7/06* | (2006.01) |
| *H02K 11/20* | (2016.01) |
| *F16H 25/20* | (2006.01) |
| *F16H 25/22* | (2006.01) |

(52) U.S. Cl.
CPC ..... *F16H 25/2015* (2013.01); *F16H 25/2204* (2013.01); *F16H 2025/2087* (2013.01)

(58) Field of Classification Search
CPC ................................. H02K 7/06; H02K 11/24
See application file for complete search history.

(56) References Cited

U.S. PATENT DOCUMENTS

| | | | | |
|---|---|---|---|---|
| 6,450,006 B1* | 9/2002 | Dougherty | ............... | G01N 7/14 73/19.01 |
| 2002/0074866 A1* | 6/2002 | Morishima | ......... | F16H 25/2015 310/80 |
| 2002/0152849 A1* | 10/2002 | Jenkins | ............... | B25B 23/1425 81/479 |

FOREIGN PATENT DOCUMENTS

| | | |
|---|---|---|
| DE | 202 13 740 U1 | 11/2002 |
| DE | 10 2008 061115 A1 | 6/2010 |
| EP | 0 036 379 A1 | 9/1981 |
| EP | 2 570 691 A1 | 3/2013 |

\* cited by examiner

*Primary Examiner* — Jorge L Carrasquillo
*Assistant Examiner* — Charles S Laughlin
(74) *Attorney, Agent, or Firm* — Baker & Hostetler LLP

(57) ABSTRACT

A control device for a linear actuator comprises a motor coupled to a device for converting a rotational movement into a translational movement configured to move a translationally mobile part. The actuator comprises at least one mechanical stop placed on a fixed part of the actuator, the group of at least one mechanical stop being configured to act as an obstacle to the relative helicoidal movement of a stud of the translationally mobile part when the stud reaches at least one predetermined position, contact of the stud with a stop generating a torque. The control device comprises a control module connected to at least one strain gauge configured to generate a signal indicative of the detected torque, the control module being configured to compare the amplitude of the signal generated by the group of at least one strain gauge against at least one predetermined value.

11 Claims, 4 Drawing Sheets

CONTROL DEVICE FOR LINEAR ACTUATOR, AND ASSOCIATED ACTUATOR, METHOD AND USE

CROSS-REFERENCE TO RELATED APPLICATIONS

This application claims priority to foreign French patent application No. FR 1502340, filed on Nov. 6, 2015, the disclosure of which is incorporated by reference in its entirety.

FIELD OF THE INVENTION

The present invention relates to the field of mechanical linear actuators. The present invention relates more particularly to a control device for a linear actuator, to a method for resetting the position of a linear actuator, to a linear actuator and to a use of the said actuator.

BACKGROUND

The present invention may find an application for example in the field of space. For space applications, adding sensors to a mini actuator in order to measure various pieces of information such as actuator failure, the position, the start or the end of travel of the actuator rod or any other piece of information, may be a complex and costly business because of the space, redundancy and weight constraints associated with this field. In addition, certain sensors are somewhat inaccurate and somewhat unreliable and therefore incompatible with the field of space.

SUMMARY OF THE INVENTION

It is an object of the invention in particular to correct all or some of the disadvantages of the prior art by proposing a simple solution for improving the reliability of a mechanical linear actuator without increasing either its size or its weight.

To this end, one subject of the invention is a control device for a linear actuator, the said linear actuator comprising a casing and a motor coupled to a device for converting a rotational movement into a translational movement, the said device for converting a rotational movement into a translational movement being configured to move a translationally mobile part, the translationally mobile part of the device for converting a rotational movement into a translational movement comprising a stud, the actuator comprising a group of at least one mechanical stop placed on a fixed part of the said actuator, the group of at least one mechanical stop being configured to act as an obstacle to the translational movement of the stud of the translationally mobile part when the stud reaches at least a predetermined position, the contact of the said stud with a stop generating a torque, the control device comprising a control module and a group of at least one strain gauge configured to generate a signal indicative of the torque detected, the control module being connected to the group of at least one strain gauge and being configured to compare the amplitude of the signal generated by the group of at least one strain gauge against at least one predetermined value.

According to one embodiment, the device for converting a rotational movement into a translational movement comprises a device for blocking rotation with respect to the casing of the actuator, the said group of at least one strain gauge being placed on the said rotation-blocking device.

According to one embodiment, the device comprises at least four strain gauges, the said gauges being connected to one another in such a way as to form at least one Wheatstone bridge.

According to one embodiment, at least one mechanical stop is made from an elastic material.

According to one embodiment, the actuator comprises a reduction device coupled at the output of the motor.

According to one embodiment, a predetermined value indicates a predetermined position of the translationally mobile part of the device for converting a rotational movement into a translational movement.

According to one embodiment, the predetermined position is a start of travel of the translationally mobile part.

According to one embodiment, the predetermined position is an end of travel of the translationally mobile part.

According to one embodiment, a predetermined value indicates abnormal operation of the actuator.

Another subject of the invention is a linear actuator comprising at least one motor configured to drive the rotation of a device for converting a rotational movement into a translational movement, the said actuator comprising a control device as described hereinabove.

Another subject of the invention is a method for resetting information regarding the position of the translationally mobile part of a device for converting a rotational movement into a translational movement of a linear actuator as described hereinabove, the said actuator comprising a positioning module configured to deliver information regarding the position of the translationally mobile part with respect to at least one predetermined position, the said method comprising:

a step of setting the motor in motion in a given direction,
a step of comparing the amplitude of the signal delivered by the group of at least one strain gauge against a predetermined value indicating a predetermined position of the translationally mobile part,
if the value of the amplitude of the signal delivered by the group of at least one strain gauge is greater than or equal to the said predetermined value, a step of stopping the motor and of resetting the positioning module.

Another subject of the invention is the use of the control device as described hereinabove in a linear actuator in order to halt the travel of the translationally mobile part of the device for converting a rotational movement into a translational movement when the amplitude of the signal generated by the group of at least one strain gauge is greater than or equal to a predetermined value.

BRIEF DESCRIPTION OF THE DRAWINGS

Other specific features and advantages of the present invention will become more clearly apparent on reading the following description, given by way of nonlimiting illustration with reference to the attached drawings, in which.

DETAILED DESCRIPTION

The principle behind the invention relies on the use of strain gauges to pick up various pieces of information regarding the status of a mechanical linear actuator.

Figure 1:
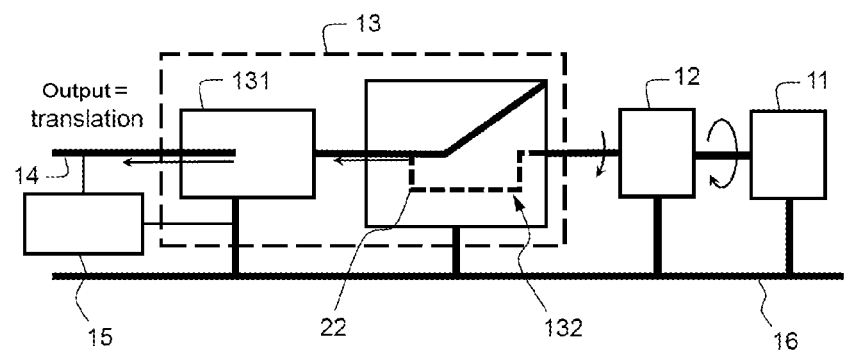
FIG. 1 schematically depicts one example of an actuator according to the invention.

FIG. 1 schematically depicts one exemplary embodiment of an electromechanical linear actuator according to the invention. The actuator comprises a motor 11, a device for converting a rotational movement into a translational movement 13. These various means are housed inside the casing 16 of the actuator.

The motor 11 is coupled to the device for converting a rotational movement into a translational movement 13 and is configured to drive the rotation of the latter. The motor 11 may for example be a motor of the stepping type or any other type of electric motor known to those skilled in the art.

According to an alternative form of embodiment, the linear actuator may comprise a reduction device 12 connected between the motor 11 and the device for converting a rotational movement into a translational movement 13.

The device for converting a rotational movement into a translational movement 13 is, for example, a device of the screw/nut type, a roller screw, a ball screw or any other equivalent device. The rotation of the motor 11 coupled to this device 13 translationally drives a mobile part 14 of the device for converting a rotational movement into a translational movement 13.

The device for converting a rotational movement 13 has a rotating part at input and a part moving translationally at output. There is friction between these two parts. If the part configured for translational movement is free to turn, it will turn because of the friction, and will perhaps also effect partial translational movement according to the other stresses applied to it. In order for the part configured to effect a translational movement to perform its role, the device for converting a rotational movement into a translational movement 13 comprises a device for blocking rotation 131 with respect to the casing 16 of the actuator, or antirotation system. This device 131 is secured to the casing 16 of the actuator. It is a mechanical component the purpose of which is to stop the rotation of the device for converting the rotational movement into a translational movement 13. This blocking device 131 may be a gaiter.

The blocking device 131 needs to be torsionally as stiff as possible in order for the rotation to be as small as possible and the translation as perfect as possible. The blocking device 131 also needs to be as soft as possible in terms of translation in order not to prevent the translational movement from occurring. Now, within a given space, these two requirements are contradictory. A system or a mechanical component cannot be as translationally soft as is wanted while at the same time being as torsionally stiff as might be desired, and therefore a compromise has to be found. As a result, the torsional stiffness is not as high as desired, unlike the torsional stiffness of the housing, for example, which means that the blocking device 131 is, generally, the torsionally softest element in the load pathway 30.

The translationally mobile part 14 of the device for converting the rotational movement into a translational movement 13 comprises a stud 22 or a tooth. As the mobile part 14 moves, this stud 22 performs a regular or irregular helicoidal relative movement with respect to the stop 132 in rotation.

The linear actuator comprises at least one mechanical stop 132 placed on a fixed part of the said actuator. Each stop 132 is configured to collaborate with the stud 22 and act as an obstacle to the translational movement thereof when the mobile part 14, or rod of the actuator reaches a predetermined position.

According to one embodiment, the actuator comprises two mechanical stops 132, a start of travel stop and an end of travel stop.

Figure 2A:
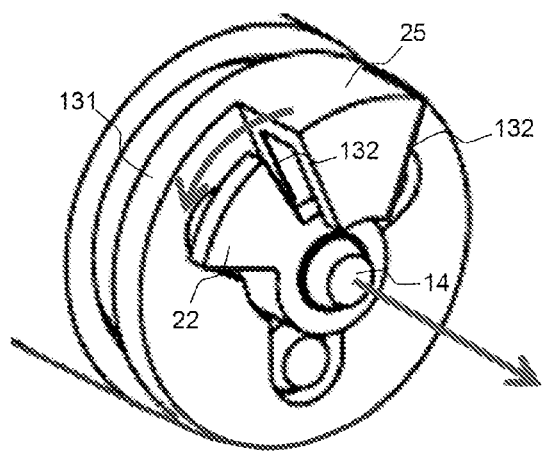
FIG. 2a depicts one exemplary embodiment of a mechanical stop.

By way of example, FIG. 2 illustrates one particular embodiment of a stud 22 and of mechanical stops 132 in the case of a short-travel linear microactuator. In this embodiment, the two stops 132 are on one and the same mechanical component 25.

Figure 3:
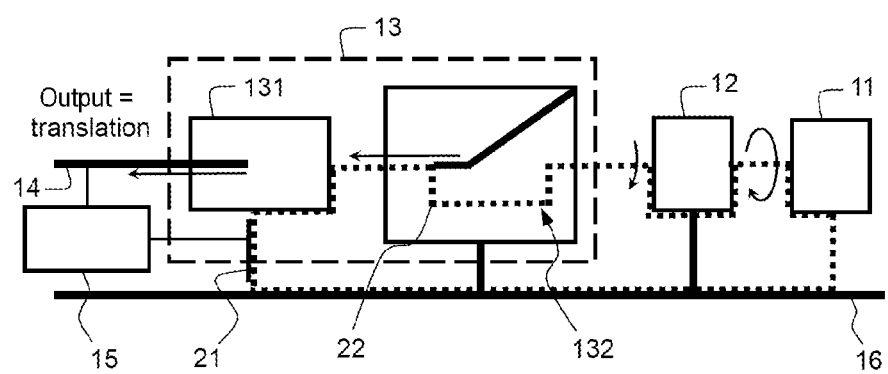
FIG. 3 illustrates the load pathway.

When the stud 22 comes into contact with a stop 132 a torque is created, the load of which will be propagated along the entire load pathway 30. With reference to FIG. 3, the load pathway 30 corresponds to all of the actuator components to which the said load is transmitted.

The actuator comprises a control device comprising at least one strain gauge 21 and a control module 15.

With reference to FIG. 3, the group of at least one strain gauge 21 is configured to generate a signal indicative of the torque or load detected. The strain gauge or gauges 21 may be placed on any element on the load pathway 30. According to one preferred embodiment, the group of at least one strain gauge is placed on the softest element of the load pathway 30 thereby allowing the greatest deformation. For preference, the group of at least one strain gauge 21 is placed on the rotation-blocking device 131 of the device for converting the rotational movement into a translational movement 13. Because this device 131 is the element of lowest stiffness, which means to say the rotationally softest element on the load pathway 30, it is therefore on this component that it is most advantageous to position the strain gauge or gauges 21. In addition, the rotation-blocking device 131 is arranged at one end of the actuator, and this allows the group of strain gauges 21 to be placed on the outside of the actuator thus avoiding the need to lead the connecting wires through the actuator casing 16.

Figure 2B:
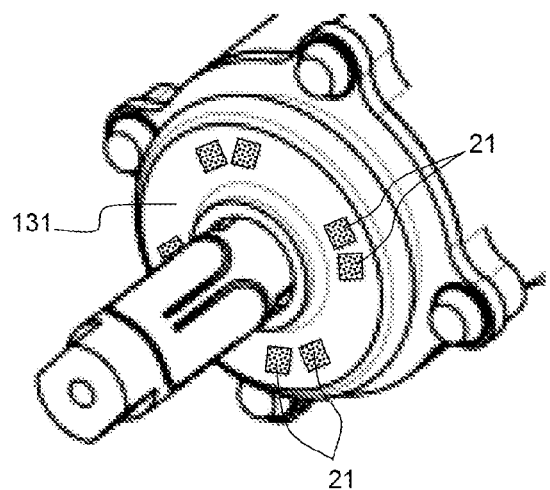
FIG. 2b depicts one exemplary embodiment of an actuator with two groups of strain gauges.

For preference, the strain gauges are grouped in fours and are connected to one another in such a way as to form at least one Wheatstone bridge. For redundancy reasons, the actuator may comprise two groups of four strain gauges 21, as illustrated in FIG. 2*b*.

The strain gauge or gauges 21 are connected to a control module 15 configured to compare the amplitude of the signal generated by the group of at least one strain gauge 21 against at least one predetermined value.

The predetermined values may indicate various actuator statuses. For example, a certain predetermined value may correspond to the torque generated by the stud 22 coming into contact with a mechanical stop 132. In the case of start and end of travel stops, the sign of the signal generated by the gauge or gauges may make it possible to differentiate the start from the end of travel. Advantageously, the same group of strain gauges can be used to detect both the start and the end of travel of the actuator, thereby making it possible to reduce the number of sensors and therefore the size and weight of the device.

According to one embodiment, at least one mechanical stop 132 is formed using a soft or elastic material such as elastomer for example. Advantageously, the creation of soft stops allows the load to rise gradually when the stud 22 comes into contact with a mechanical stop 132 and therefore gives the electronics in the control module 15 longer to detect the load generated. This allows the use of electronics that are not of such a high speed. The creation of soft mechanical stops 132 also makes it possible to increase the time between the stud coming into contact with a mechanical stop and the moment at which the torque generated by the load is at a maximum. This for example allows the control module 15 to cut off the power to the motor 11 before the torque reaches its maximum thereby avoiding damage to or even destruction of the actuator.

The strain gauges 21 also make it possible to provide information regarding the status of the actuator even when the latter is not against a stop. The gauges 21 make it possible to monitor load on one or more components of the actuator. If the value of the load observed differs from its nominal value, this may indicate abnormal operation, wear, blockage of a component or any other anomaly. The device therefore allows functional detection of anomalies, while the actuator is in use.

For example, in the case of an actuator effecting micro movements, after a certain length of time, the grease in the ball bearings or in the roller screws is gradually driven out from each side of the balls or of the rollers. After a great many movements, the balls or the rollers will find themselves running dry with metal-to-metal contacts leading to greater friction and therefore greater difficulty in moving. This anomaly may be detected by the control module 15 via the signal generated by the strain gauges and this module 15 will be able to send a command signal to the actuator to make it perform a relubrication operation such as, for example, greater-amplitude movements in order to redistribute the grease.

Figure 4A:
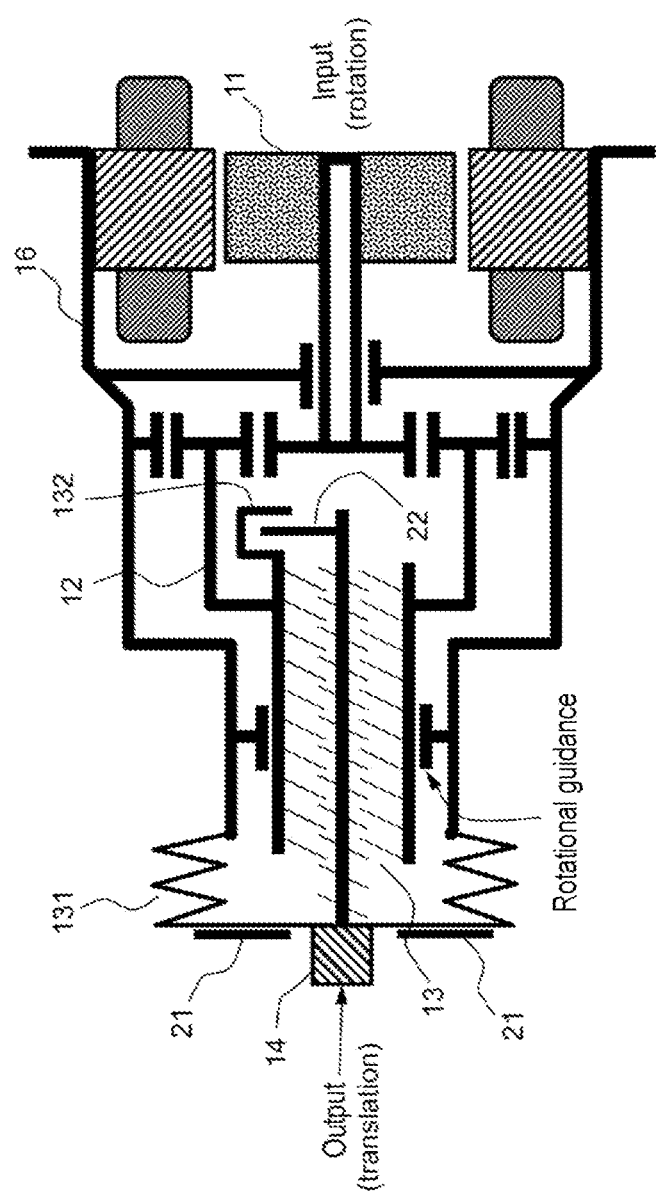
FIG. 4a depicts a view in cross section of one exemplary embodiment of an actuator according to the invention.
Figure 4B:
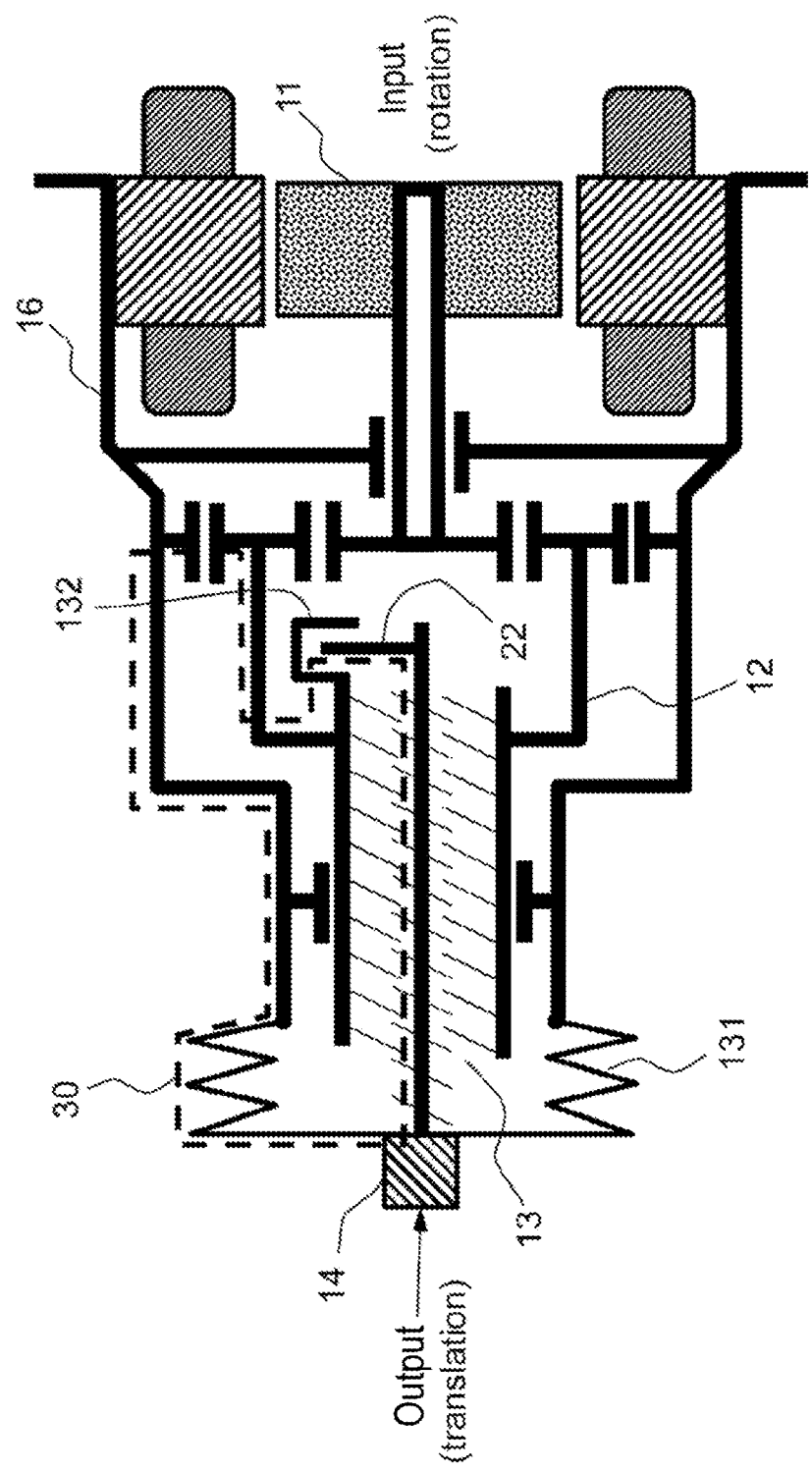
FIG. 4*b* illustrates the load pathway on the previous exemplary embodiment.

By way of example, FIGS. 4a and 4b illustrate one particular embodiment of a mechanical linear actuator according to the invention in which the rotation-blocking device 131 is a gaiter. FIG. 4b illustrates the load pathway 30 for this exemplary embodiment.

The control device may be used, for example, by the control module 15, to send a command signal to cut the supply of power to the motor 11 so as to halt the travel of the translationally mobile part 14 of the device for converting a rotational movement into a translational movement 13 when the amplitude of the signal generated by the group of at least one strain gauge 21 is greater than or equal to a predetermined value. This predetermined value of the amplitude of the signal coming from the strain gauges 21 may for example indicate a start or an end of travel of the actuator.

Advantageously, the invention makes it possible to create a start and/or end of linear actuator travel sensor that is simple, reliable and compact and occupies very little space.

According to one embodiment of the invention, the device for controlling the linear actuator may make it possible to reset and/or set the position information relating to the translationally mobile part 14 of the device for converting a rotational movement into a translational movement 13 of the linear actuator with respect to at least one predetermined position.

For example, in normal operation, the translationally mobile part 14 of the linear actuator may move between two mechanical stops 132 without reaching these stops. In this case, the stops 132 act not as start and end of travel stops but as reference stops making it possible to fix a position reference for the mobile part 14. According to an alternative form of embodiment, the actuator may comprise just one single reference mechanical stop 132. The position of the mobile part 14 is determined in relative terms with respect to at least one reference position corresponding to the position of the reference stops. To do that, the actuator may comprise a positioning module configured to deliver information regarding the position of the translationally mobile part 14.

The motor 11 of the actuator may be a stepping motor and the positioning module may be configured to count the steps of the said motor 11 in order to deliver a signal indicative of the relative position of the mobile part with respect to at least one reference position.

According to an alternative form of embodiment, the actuator may comprise a revolution counter device configured to deliver a signal indicative of the number of revolutions of the shaft of the motor 11 or of the reduction gear 12 to the positioning module so that the latter can calculate the relative position of the mobile part 14 with respect to the position reference or references.

In order to reset the information regarding the position of the mobile part 14, for example following a maintenance operation performed on the actuator, following a failure thereof or as part of routine maintenance in order to ensure correct actuator operation, this actuator may comprise a reset procedure performed for example by the positioning module and/or the control module. The positioning module may for example send the control module 15 a reset signal in order to drive the rotation of the motor 11 in a certain direction in order to move the translationally mobile part as far as a mechanical stop 132. While the mobile part is moving, the amplitude of the signal delivered by the group of at least one strain gauge is compared against a predetermined value indicative of a reference position of the translationally mobile part 14. When the value of the amplitude of the signal delivered by the group of at least one strain gauge 21 is greater than or equal to the said predetermined value, the control module may send a command signal to the motor in order to halt the supply of power thereto and stop the movement of the mobile part 14. The positioning module may be reset by recording a predetermined value, such as zero for example, in a memory zone so as to adopt this position as reference.

According to one embodiment, the reset procedure may allow the mobile part 14 to move as far as the second reference mechanical stop 132 so that the positioning module records a new predetermined value corresponding to this second reference position.

This reset procedure can be performed upon first use of the actuator in order to set up the positioning module.

The various modules such as the control module and the position module may be one or more microprocessors, processors, computers or any other suitably programmed equivalent means.

The invention claimed is:

1. A control device for a linear actuator, said linear actuator comprising a casing and a motor coupled to a conversion device for converting a rotational movement into a translational movement, the conversion device being configured to move a translationally mobile part translationally, the translationally mobile part comprising a stud, said conversion device comprising a rotation-blocking device for blocking rotation of the mobile part with respect to the casing of the linear actuator, the linear actuator further comprising a group of at least one mechanical stop arranged on a rotating part of the conversion device and arranged so as to come into contact with the stud of the translationally mobile part when the stud translates and reaches at least a predetermined position; a contact of the stud against said at least one mechanical stop generating a torque on the rotation-blocking device, wherein said control device comprises a control module and at least one strain gauge arranged on the rotation-blocking device so as to detect a torque applied to the rotation-blocking device and configured to generate a signal indicative of the torque detected, the control module being connected to the at least one strain gauge and being configured to compare the amplitude of the signal generated by the at least one strain gauge to at least one predetermined value.

2. The device according to claim 1, the at least one strain gauge comprising at least four strain gauges, said gauges being connected to one another in such a way as to form at least one Wheatstone bridge.

3. The device according to claim 1, wherein the at least one mechanical stop is made from an elastic material.

4. The device according to claim 1, wherein the actuator comprises a reduction device coupled at the output of the motor.

5. The device according to claim 1, wherein a predetermined value indicates a predetermined position of the translationally mobile part of the conversion device.

6. The device according to claim 5, wherein the predetermined position is a start of travel of the translationally mobile part.

7. The device according to claim 5, wherein the predetermined position is an end of travel of the translationally mobile part.

8. The device according to claim 1, wherein a predetermined value indicates abnormal operation of the actuator.

9. A linear actuator comprising at least one motor configured to drive the rotation of a device for converting a rotational movement of the motor into a translational movement, configured to move a mobile part translationally, said actuator comprising a control device according to claim 1.

10. A method for resetting information regarding the position of the translationally mobile part of the linear actuator according to claim 1, the actuator comprising a positioning module configured to deliver information regarding the position of the translationally mobile part with respect to at least one predetermined position, the method comprising:
   a step of setting the motor in motion in a given direction,
   a step of comparing the amplitude of the signal delivered by the at least one strain gauge to a predetermined value indicating a predetermined position of the translationally mobile part,
   if the value of the amplitude of the signal delivered by the at least one strain gauge is greater than or equal to the said predetermined value, a step of stopping the motor and of resetting the positioning module.

11. A method of using the control device according to claim 1 in a linear actuator comprising at least one motor configured to drive the rotation of a device for converting a rotational movement into a translational movement, said actuator comprising said control device, in order to halt the travel of a translationally mobile part of the device for converting a rotational movement into a translational movement when the amplitude of the signal generated by the at least one strain gauge is greater than or equal to a predetermined value.

* * * * *